(12) United States Patent
Shin et al.

(10) Patent No.: US 10,963,323 B2
(45) Date of Patent: Mar. 30, 2021

(54) METHOD AND APPARATUS FOR TRANSFORMATION OF MPI PROGRAMS FOR MEMORY CENTRIC COMPUTERS

(71) Applicants: SANGMYUNG UNIVERSITY INDUSTRY-ACADEMY COOPERATION FOUNDATION, Seoul (KR); ELECTRONICS AND TELECOMMUNICATIONS RESEARCH INSTITUTE, Daejeon (KR)

(72) Inventors: Dong Ha Shin, Goyang-si (KR); Je Man Lee, Seoul (KR); Seung-Chul Lee, Seoul (KR); Kang Ho Kim, Daejeon (KR)

(73) Assignee: Sangyung University Industry-Academy Cooperation Foundation

( * ) Notice: Subject to any disclaimer, the term of this patent is extended or adjusted under 35 U.S.C. 154(b) by 0 days.

(21) Appl. No.: 16/659,761

(22) Filed: Oct. 22, 2019

(65) Prior Publication Data

US 2020/0133749 A1 Apr. 30, 2020

(30) Foreign Application Priority Data

Oct. 25, 2018 (KR) .................. 10-2018-0128371
Dec. 12, 2018 (KR) .................. 10-2018-0160347

(51) Int. Cl.
*G06F 9/54* (2006.01)
*G06F 8/41* (2018.01)
*G06F 40/151* (2020.01)
*G06F 40/205* (2020.01)

(52) U.S. Cl.
CPC .............. *G06F 9/546* (2013.01); *G06F 8/427* (2013.01); *G06F 40/151* (2020.01); *G06F 40/205* (2020.01)

(58) Field of Classification Search
None
See application file for complete search history.

(56) References Cited

U.S. PATENT DOCUMENTS

| | | | |
|---|---|---|---|
| 6,457,106 B1 * | 9/2002 | Watanabe | G06F 13/161 710/240 |
| 9,292,458 B2 | 3/2016 | Chung et al. | |
| 2007/0174558 A1 * | 7/2007 | Jia | G06F 9/546 711/147 |
| 2017/0366612 A1 | 12/2017 | Yamada et al. | |
| 2019/0332449 A1 * | 10/2019 | Adolfsson | G06F 9/5038 |

FOREIGN PATENT DOCUMENTS

| | | |
|---|---|---|
| JP | 2017224253 | 12/2017 |
| KR | 10176088 | 5/1999 |
| KR | 20140071194 | 6/2014 |

* cited by examiner

*Primary Examiner* — Craig C Dorais
(74) *Attorney, Agent, or Firm* — Perman & Green, LLP

(57) ABSTRACT

According to a method of transforming a message passing interface (MPI) program, an MPI function is parsed such that a computer may directly access data created by another computer through a memory when an MPI parallel program is executed on a computer system for distributed processing, a network function corresponding to the MPI function is created for network communication, and a bus line function is created for directly accessing the memory through a bus line.

16 Claims, 8 Drawing Sheets

METHOD AND APPARATUS FOR TRANSFORMATION OF MPI PROGRAMS FOR MEMORY CENTRIC COMPUTERS

CROSS-REFERENCE TO RELATED APPLICATIONS

This application claims the benefits of Korean Patent Application No. 10-2018-0128371, filed on Oct. 25, 2018, and No. 10-2018-0160347, filed on Dec. 12, 2018, in the Korean Intellectual Property Office, the disclosures of which are incorporated herein in their entirety by reference.

BACKGROUND

1. Field

One or more aspects of the disclosed embodiment relate a method and apparatus for transformation of MPI programs for memory centric computers.

2. Brief Description of Related Developments

Figure 1:
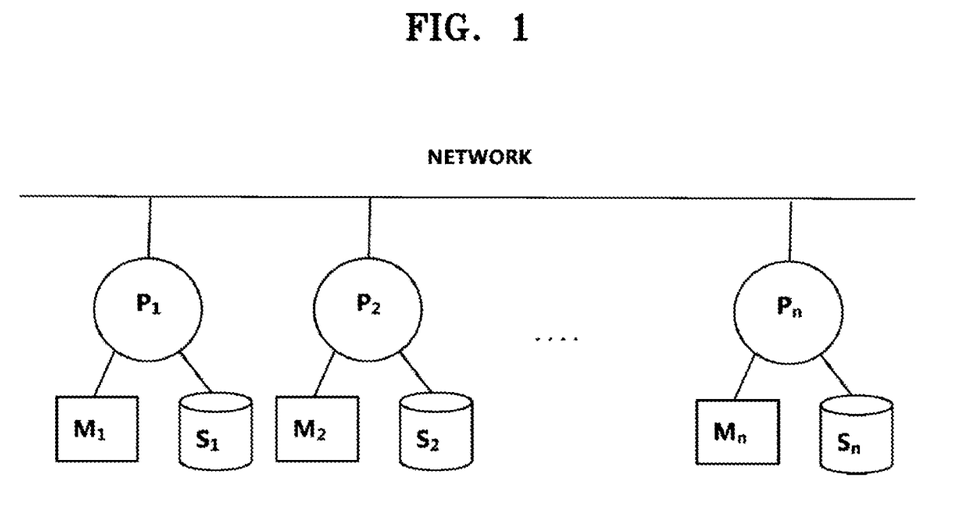
FIG. 1 is a view illustrating an example of a computer system having a distributed memory architecture.

A high performance computer (HPC) system with a distributed memory architecture has a structure that a plurality of unit computers (or processors P1 to Pn) are connected in parallel to each other through a single communication network as shown in FIG. 1. In an HPC system, while unit computers execute a parallel program, one of the unit computers transmits messages containing results of intermediate calculations to the other unit computers through a communication network. The unit computers of such a HPC system of the related art are respectively provided with semiconductor storages such as memories M1 to Mn and physical storages S1 to Sn such as hard disk drives (HDDs).

Such a method of transmitting messages between unit computers through a communication network is slow, and thus there is a limit to improving the performance of parallel programs. This is due to the inherent limitations of communication networks.

SUMMARY

One or more aspects of the disclosed embodiment include a method and apparatus for transforming message passing interface (MPI) parallel programs such that the MPI parallel programs originally developed for existing high performance computers may be more efficiently executed on memory centric computers.

One or more aspects of the disclosed embodiment include a transformation method in which when an MPI parallel program is executed on a computer system for distributed processing, at least one of MPI functions is parsed such that data created by a computer may be directly accessed by another computer, and the MPI function is transformed into a network function for basic communication with other computers, and a bus line command for directly accessing a memory through a bus line is created.

One or more aspects of the disclosed embodiment provide at least one message structure of a new type (one structure of a new type for message) and a plurality of helper functions for automatic transformation of MPI parallel programs. In addition, one or more aspects of the disclosed embodiment provide methods of transforming MPI functions by using the structure and functions.

According to one or more aspects of the disclosed embodiment, a method of transforming MPI programs may include:
loading a source code of an MPI parallel program for a high performance computer system in which a plurality of unit computers are connected in parallel to each other for distributed processing;
parsing the source code to extract an MPI function statement;
creating, from an MPI function corresponding to the MPI function statement, a network function statement for communication with other computers through a network and a bus line function statement for directly accessing a memory shared by a plurality of unit computers through a bus line; and
storing a transformed source code including the network function statement and the bus line function statement.

In the method of the one or more aspects of the disclosed embodiment, the network function statement may include an absolute address transporter storing absolute address information.

In the method of the one or more aspects of the disclosed embodiment, the absolute address transporter may be created by a structure (object) including absolute address information about the memory.

In the method of the one or more aspects of the disclosed embodiment, the MPI function may include at least one of MPI_Send, MPI_Recv, MPI_Bcast, MPI_Reduce, MPI_Scatter, and MPI_Gather.

In the method of the one or more aspects of the disclosed embodiment, a statement including the MPI_Send function may include, as a parameter, an absolute address transporter storing absolute address information, and after the statement including the MPI_Send function is executed, a response from a target computer may be waited for.

In the method of the one or more aspects of the disclosed embodiment, a statement including the MPI_Recv function may include, as a parameter, an absolute address transporter storing absolute address information, and after the statement including the MPI_Recv function is executed, a response signal may be sent to a source computer which has executed an MPI_Send function command.

In the method of the one or more aspects of the disclosed embodiment,
when a corresponding process is a root process, a statement including the MPI_Bcast function may execute the MPI_Bcast function to deliver absolute address information to all other processes and may then wait for responses from all the other processes, and
when the corresponding process is not the root process, the statement including the MPI_Bcast function may execute the MPI_Bcast function and may then transmit a response signal to the root process.

In the method of the one or more aspects of the disclosed embodiment,
when a corresponding process is a root process, a statement including the MPI_Reduce function may execute the MPI_Reduce function to receive absolute address information from all other processes and perform an operator calculation, and
when the corresponding process is not the root process, the statement including the MPI_Reduce function may execute the MPI_Reduce function to deliver absolute address information about the corresponding process to the root process.

In the method of the one or more aspects of the disclosed embodiment, when a corresponding process is a root process, a statement including the MPI_Scatter function may execute the MPI_Scatter function to deliver an array of absolute address information about all other processes, and when the corresponding process is not the root process, the statement including the MPI_Scatter function may execute the MPI_Scatter function to store a message transmitted from the root process in absolute address information about the corresponding process.

In the method of the one or more aspects of the disclosed embodiment, when a corresponding process is a root process, a statement including the MPI_Gather function may execute the MPI_Gather function to store absolute address information about another process at an absolute address of the corresponding process as an array and then store absolute address information about all other processes as an array, and when the corresponding process is not the root process, the statement including the MPI_Gather function may execute the MPI_Gather function to deliver absolute address information about the corresponding process.

According to one or more aspects of the disclosed embodiment, there is provided an apparatus for transforming a source code of an MPI parallel program for a computer system in which a plurality of computers are connected in parallel to each other for distributed processing, the apparatus including:

a storage medium storing a source code and a transformed source code; and a processing device configured to parse the source code to extract an MPI function statement, creates, from an MPI function corresponding to the MPI function statement, at least one network function statement for communication with other computers through a network and at least one bus line function statement for directly accessing a memory shared by a plurality of computers through a bus line, store a transformed source code including the network function statement and the bus line function statement in the storage medium.

DETAILED DESCRIPTION

Reference will now be made in detail to aspects of the disclosed embodiment, examples of which are illustrated in the accompanying drawings, wherein like reference numerals refer to like elements throughout. In this regard, the aspects of the presently disclosed embodiment may have different forms and should not be construed as being limited to the descriptions set forth herein. Accordingly, the aspects of the disclosed embodiment are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a method of transforming MPI programs will be described according to one or more aspects of the disclosed embodiment with reference to the accompanying drawings.

Figure 2:
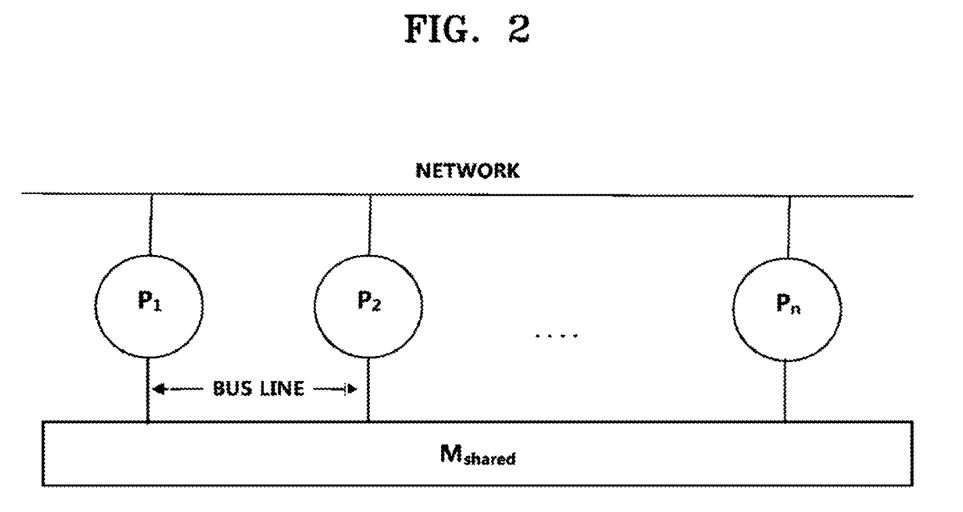
FIG. 2 is a view illustrating an example of a computer system having a memory centric architecture.

As shown in FIG. 2, a memory centric (MC) computer system has an architecture in which a plurality of unit computers P1 to Pn are directly connected to a high-speed shared memory Mshared such that messages may be transmitted between the unit computers P1 to Pn by directly accessing the shared memory Mshared instead of using a relatively slow communication network.

Many parallel programs which have been developed so far are configured to use functions of a standard library called "message passing interface (MPI)," and although memory centric computer systems have been newly developed, such MPI parallel programs may be inefficiently executed because a relatively slow communication network is used.

Unlike existing distributed memory computer systems, such a memory centric computer system as shown in FIG. 2 has an architecture in which all unit computers share a shared memory Mshared and use only the shared memory Mshared (semiconductor storage) without using physical storages such as hard disk drives (HDDs). Such memory centric computer systems have been enhanced owing to semiconductor memories which have been rapidly improved in processing speed and capacity compared to central processing units (CPUs) of which development is already saturated.

According to one or more aspects of the disclosed embodiment, in an MPI parallel program of a high performance computer system having a CPU centric architecture for distributed processing, an MPI function included in a source code is parsed such that data created by a computer may be directly accessed by another computer through a memory, the MPI function is transformed to at least one network function for basic communication with other computers, and at least one bus line command is created to directly access the memory storing results of calculations by other computers through a bus line.

The above-mentioned MPI is a compatible standard library for parallel programming, and currently supports programming languages such as C, C++, and Fortran. The MPI is a parallel programming tool which is most commonly used in high performance computing (HPC) systems, and is managed by the MPI Forum consisting of academics and industry organizations.

Figure 3:
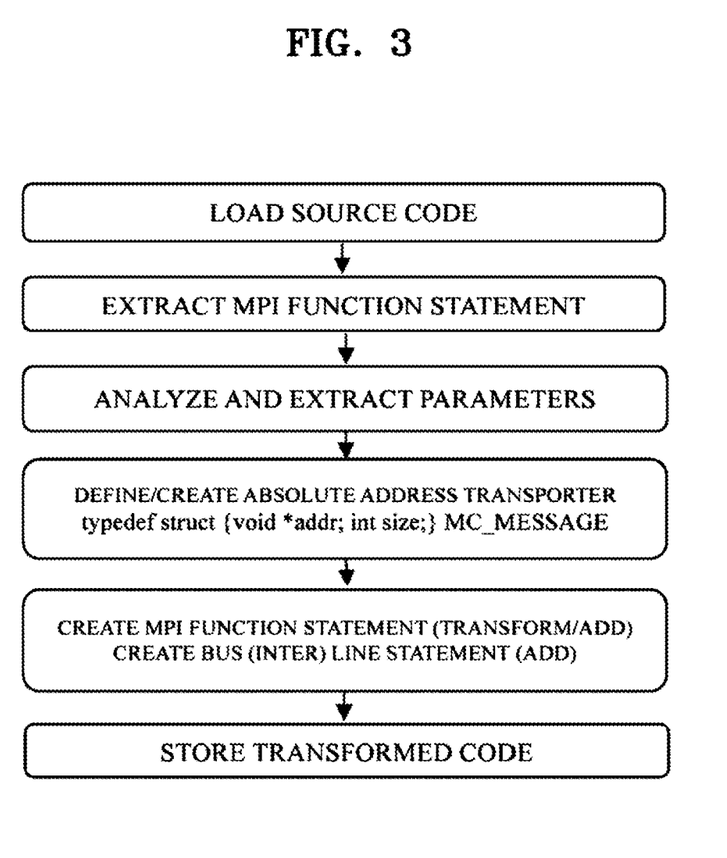
FIG. 3 is a flowchart schematically illustrating transformation of a function according to one or more aspects of the disclosed embodiment.

As shown in FIG. 3, a program transformation method includes:

loading a source code;

parsing the source code to extract an MPI function statement to be transformed;

extracting function parameters from the statement;

defining and creating an absolute address transporter for transmitting memory information to other computers;

transforming an extracted MPI function into a network command (one or more commands) for basic communication between unit computers through a network and creating a bus line command (one or more commands) for directly accessing a memory through a bus line; and storing a transformed code including the statement transformed as described above.

The MPI described in the description of the one or more aspects of the disclosed embodiment is a representative of libraries for parallel processing, but the present disclosure is not limited to the specific library.

In one or more aspects of the disclosed embodiment, the absolute address of a memory, in which results of a calculation performed by another computer is stored, is received from the other computer by using a network function, and a computer receiving the absolute address directly accesses the absolute address on the memory via a bus line function.

To this end, in one or more aspects of the disclosed embodiment, a structure for storing and transmitting an absolute address and helper functions related thereto are defined and created.

Here, the creation of the structure is to deliver the absolute location of a memory, and it is possible to replace the structure with one or more independent variables, especially pointer variables.

I. Absolute Address Transporter

According to one or more aspects of the disclosed embodiment, the following new structure such as "MC_MESSAGE" is defined such that an MPI parallel program for an existing high performance computer system may be more efficiently executed on memory centric computers.

The structure may include an absolute address variable for storing the absolute address of a message to be transmitted and received, and a size variable for storing the size of the absolute address variable as members thereof. The structure MC_MESSAGE defined as below is to express a fixed-byte message (size-1) and may include address information and the size of the address information, for example, member "addr" for storing an address and member "size" for storing a size (length).

```
typedef struct {
    void *addr;
    int size;
} MC_MESSAGE
```

II. Helper Functions

According to One or more aspects of the disclosed embodiment, helper functions such as the following helper functions are defined to automatically transform an MPI parallel program such that the MPI parallel program may be more efficiently executed on a memory centric computer system. According to one or more aspects of the disclosed embodiment, these functions are also used to transform MPI functions.

A. Helper Function 1

A function for transforming the virtual address of the current process to an absolute address may be needed. To this end, a helper function 1 is defined as follows in the aspects of the presently disclosed embodiment.

MC_Address(addr)

The MC_Address function may transform the virtual address "addr" of the current process into an absolute address and may return the absolute address as a return value.

B. Helper Function 2

It may be necessary to copy data from an absolute address to the virtual address of the current process. To this end, a helper function 2 is defined as follows in the aspects of the presently disclosed embodiment.

MC_Memcpy(to, from, size)

Data having a size of a parameter "size" and delivered from an absolute address specified by a parameter "from" is copied to the virtual address of the current process specified by a parameter "to" by the MC_Memcpy function.

C. Helper Function 3

A function for sending a signal to a unit computer may be necessary for communication with a unit computer having a particular rank. To this end, a helper function 3 is defined as follows in the aspects of the presently disclosed embodiment.

MC_Post(Rank)

The MC_Post function sends a response signal to a unit computer (process) having a given rank (unit or process number). This function may be used to determine whether it is possible to communicate with the unit computer.

D. Helper Function 4

A function for waiting for a response from a unit computer after sending a signal to the unit computer may be necessary for communication with a particular unit computer. To this end, a helper function 4 is defined as follows in the aspects of the presently disclosed embodiment.

MC_Pend(rank)

The MC_Pend function waits for a response signal from a unit computer unit having a corresponding rank.

E. Helper Function 5

A unit computer may need a function for sending a signal to all other processes in the same communication network or process group (communicator, comm.). To this end, a helper function 5 is defined as follows in the aspects of the presently disclosed embodiment.

MC_Post_all(comm)

The MC_Post_all function sends a signal to all the ranks (excluding the current rank) constituting a given process group (comm.).

F. Helper Function 6

A unit computer may need a function for receiving a signal from a process in the same communication network or process group (communicator, comm.). To this end, a helper function 6 is defined as follows in the aspects of the presently disclosed embodiment.

MC_Pend_all(comm)

The MC_Pend_all function waits for signals sent from all the ranks (excluding the current rank) constituting a given process group (comm.).

G. Helper Function 7

A function corresponding to each MPI reduce operator may be necessary, and to this end, a helper function 7 is defined as follows in the aspects of the presently disclosed embodiment.

MC_Op(op)

The MC_Op function is prepared corresponding to an MPI reduce operator such as MPI_MAX, MPI_MIN, or MPI_SUM.

Hereinafter, methods of transforming key MPI functions in an MPI parallel program for an existing CPU centric high performance computer system will be described according to one or more a.

III. Descriptions of Key MPI Functions

Six key MPI functions are as follows.

MPI Send(buffer, count, datatype, dest, tag, comm):

MPI_Send has parameters such as "buffer," "count," "datatype," "dest," "tag," and "comm."

The current process uses this function to send a message having count*datatype bytes from a "buffer," which is a memory address (initial address), to a destination process having a "dest" rank. At this time, a tag for classifying the message may be added. The "dest" rank of the destination process denotes the rank of the destination process in a corresponding process group (comm.) in which the destination process is included. When an error occurs during the execution of the MPI function, an error code is returned.

MPI_Recv(buffer, count, datatype, source, tag, comm, status)

The MPI_Recv function has parameters such as "buffer," "count," "datatype," "source," "tag," "comm," and "status." The current process executing the MPI_Recv function receives a message sent from a process having a "source" rank and stores the message at a "message (buffer)" memory address having count*datatype bytes. At this time, a tag for classifying the message may be used. "source" refers to the rank of a process included in a "comm" process group. When an error occurs during the execution of the MPI function, an error code is returned.

MPI_Bcast(buffer, count, datatype, root, comm)

The MPI_Bcast function works differently for a root process and a non-root process. When the current process is a "root" process of a corresponding "comm" process group, a message having count*datatype bytes is sent from a "buffer" memory address to all processes other the "root" process. When the current process is not a "root" process, a message sent by the "root" process is received and stored at a "message (buffer)" memory address having count*datatype bytes. When an error occurs during the execution of the MPI function, an error code is returned.

MPI_Reduce(send_buffer, recv_buffer, count, datatype, operator, root, comm)

When the current process is a "root" process, the MPI_Reduce function receives messages from all the processes of a "comm" process group and performs an operator calculation (for example, MPI_MAX, MPI_MIN, MPI_SUM, or the like), and then stores results of the calculation in "recv_buffer." When the current process is not a "root" process, the MPI_Reduce function delivers a message having count*datatype bytes from a "send_buffer" memory address to the "root" process. When an error occurs during the execution of the MPI function, an error code is returned.

MPI_Scatter(send_buffer, send_count, send_datatype, recv_buffer, recv_count, recv_datatpe, root, comm)

When the current process is a "root" process, MPI_Scatter sends a message having send_count*send_datatype bytes from a "send_buffer" memory address to all processes included in a "comm" process group other than the "root" process. When the current process is not a "root" process, MPI_Scatter receives a message sent by the "root" process and stores the message at a "recv_buffer" memory address having recv_count*recv_datatype bytes. When an error occurs during the execution of the MPI function, an error code is returned.

MPI_Gather(send_buffer, send_count, send_datatype, recv_buffer, recv_count, recv_datatype, root, comm)

When the current process is a "root" process, MPI_Gather receives messages sent from all the processes included in a "comm" process group and stores, as an array, the message at a "recv_buffer" address having recv_count*recv_datatype bytes. When the current process is not a "root" process, MPI_Gather delivers a message having send_count*send_datatype bytes from a "send_buffer" memory address to the "root" process. When an error occurs during the execution of the MPI function, an error code is returned.

IV. Parsing of Key MPI Functions

In the present disclosure, the MPI program transformation method are used to transform the six key MPI functions, and parsing and symbolic execution which are compiler techniques are used for the transformation method.

In MPI function analysis, symbolic execution is performed to express conditions for calling each MPI function of an MPI program as the rank of the current process (for example, rank=0, rank>0, etc.) by analyzing the call rank (=MPI logic process number) argument of an MPI_Comm_rank function, and to determine, based on this information and rank information given to the call argument of each MPI function, whether the caller of each MPI function is a sender or receiver.

---

Analysis of conditions for calling each MPI function, and sender receiver

```
MPI_Comm_rank(..., &rank);        //TRUE
...
If (rank == 0)
{   MPI_Bcast(..., 0, ...);        // rank == 0, sender
...
} else {
MPI_Bcast(..., 0, ...);            // rank != 0, receivers
...
}
```

---

According to the transformation of MPI functions (transformation of MPI function calling) of the present disclosure, a multi-byte (size-m) message is transformed into a fixed-byte (size-1) message in source level with respect to calling of each MPI function of an MPI program, and at this time, sender and receiver information on each MPI function calling is used to conditionally perform the transformation.

V. Transformation of Key MPI Functions

Hereinafter, various aspects of the disclosed embodiment of the above-described methods of transforming the six key MPI functions will be described.

The methods of transforming the MPI functions are respectively described with reference to flowcharts shown in FIGS. 4 to 9.

Each of the flowcharts shown in FIGS. 4 to 9 illustrates the flow of execution of a transformed program after each MPI function is transformed. During transformation, MPI functions and parameters of the MPI functions are extracted by parsing, and a transformed code is prepared by a plurality of command lines created using the extracted functions and parameters.

<Example of Transformation of MPI_Send Function>

Figure 4:
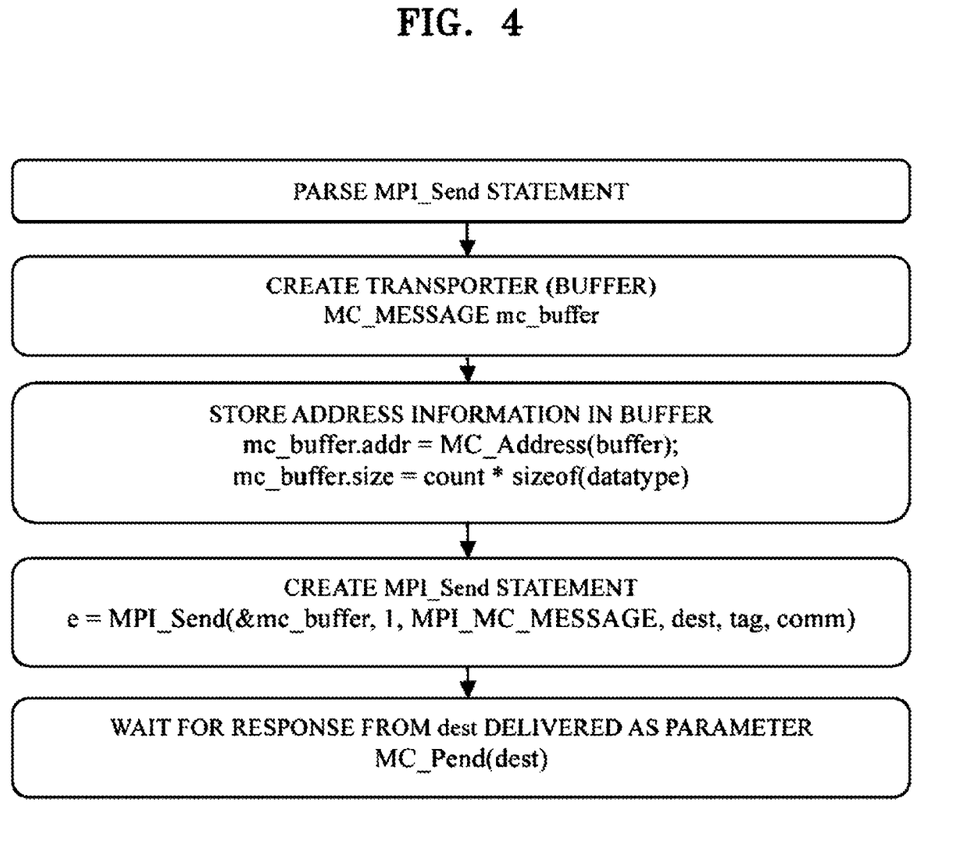
FIG. 4 is a view illustrating a method of transforming MPI_Send which is an MPI function, according to one or more aspects of the disclosed embodiment.

FIG. 4 illustrates a method of transforming (substituting) MPI_Send which is an MPI function, according to one or more aspects of the disclosed embodiment.

Input (original) code

```
e = MPI_Send(buffer, count, datatype, dest, tag, comm);
```

Output (substituted) code

```
{
    MC_MESSAGE mc_buffer;
    mc_buffer.addr = MC_Address(buffer);
    mc_buffer.size = count * sizeof(datatype);
    e = MPI_Send(&mc_buffer, 1, MPI_MC_MESSAGE, dest, tag, comm);
    MC_Pend(dest);
}
```

According to the method of the present disclosure, as shown above, a plurality of time-sequence lines, five lines in the current aspects of the disclosed embodiment, are created from an original input code having a single command line.

<Example of Transformation of MPI_Recv Function>

Figure 5:
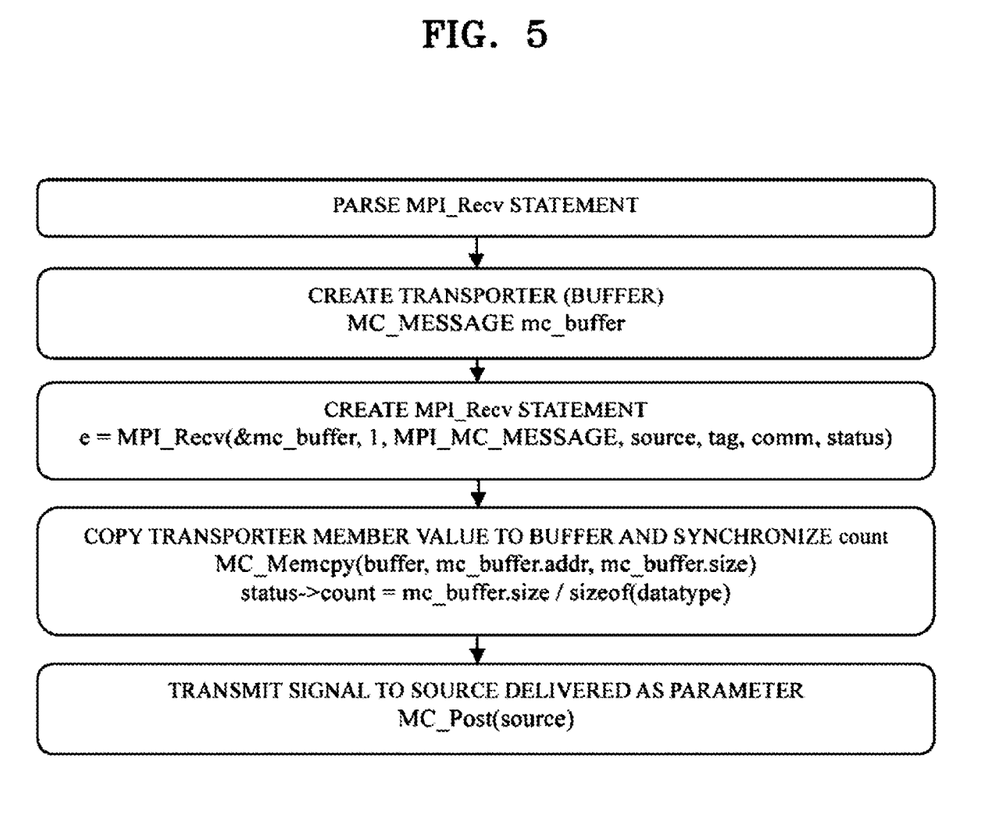
FIG. 5 illustrates a method of transforming MPI_Recv which is an MPI function, according to one or more aspects of the disclosed embodiment.

FIG. 5 illustrates a method of transforming MPI_Recv which is an MPI function, according to one or more aspects of the disclosed embodiment.

Input code

```
e = MPI_Recv(buffer, count, datatype, source, tag, comm, status);
```

Transformed code

```
{
    MC_MESSAGE mc_buffer;
    e = MPI_Recv(&mc_buffer, 1, MPI_MC_MESSAGE, source, tag, comm, status);
    MC_Memcpy(buffer, mc_buffer.addr, mc_buffer.size);
    status->count = mc_buffer.size / sizeof(datatype);
    MC_Post(source);
}
```

As shown in the above example, according to the present disclosure, the second parameter of the MPI_Recv function is delivered as a constant "1." The MPI_Recv function eventually receives a 1-byte mc_buffer. Next, an MC_Memcpy function stores memory data in "buffer" by using information on the address and size of the mc_buffer.

<Transformation of MPI_Bcast Function>

Figure 6:
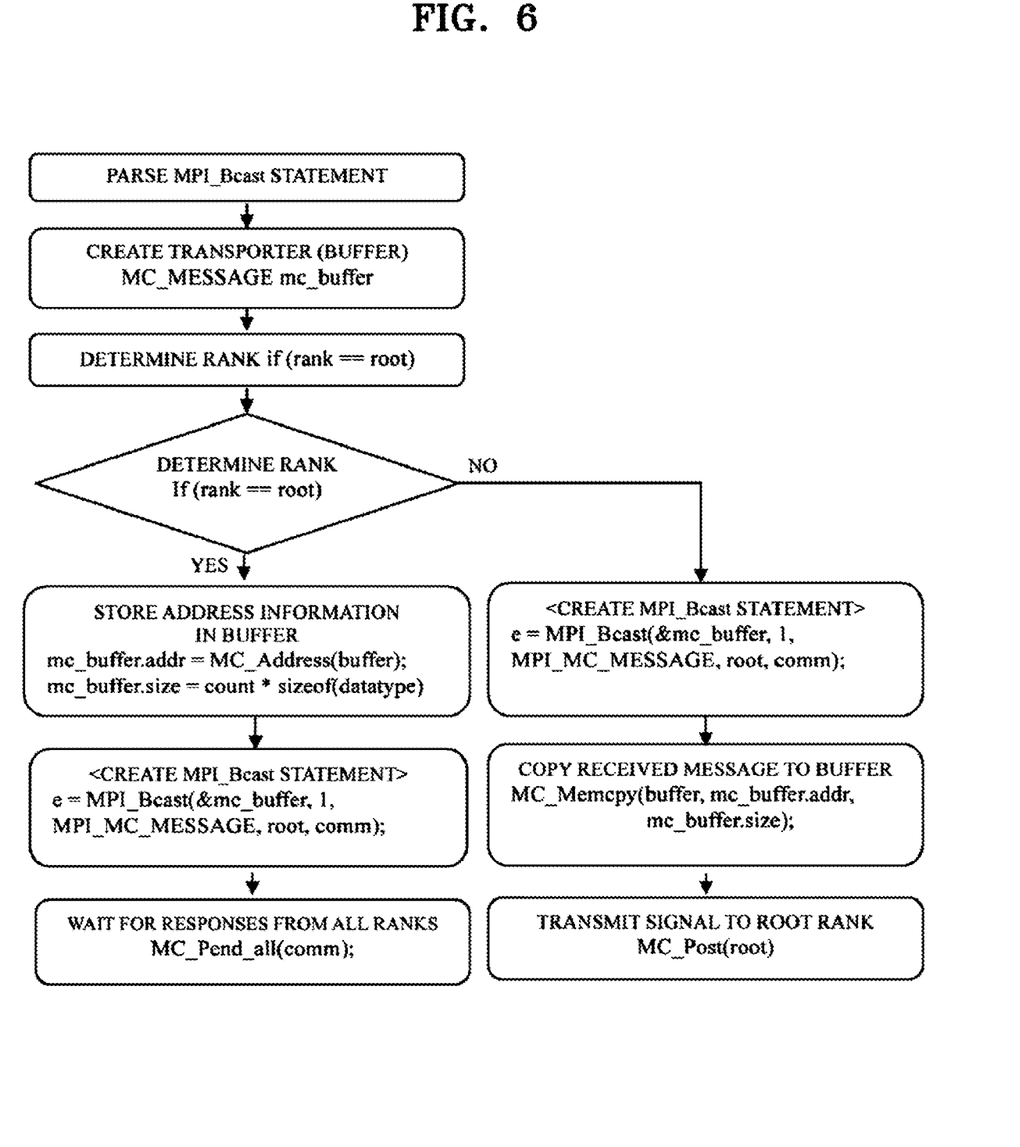
FIG. 6 illustrates a method of transforming MPI_Bcast which is an MPI function, according to one or more aspects of the disclosed embodiment.

FIG. 6 illustrates a method of transforming MPI_Bcast which is an MPI function, according to one or more aspects of the disclosed embodiment.

Input Code

```
e = MPI_Bcast(buffer, count, datatype, root, comm);
```

Transformed code

```
{
    MC_MESSAGE mc_buffer;
    if (rank == root) {// a single sender
        mc_buffer.addr = MC_Address(buffer);
        mc_buffer.size = count * sizeof(datatype);
        e = MPI_Bcast(&mc_buffer, 1,
        MPI_MC_MESSAGE, root, comm);
        MC_Pend_all(comm);
    } else {// a plurality of receivers
        e = MPI_Bcast(&mc_buffer, 1, MPI_MC_MESSAGE, root, comm);
        MC_Memcpy(buffer, mc_buffer.addr, mc_buffer.size);
        MC_Post(root);
    }
}
```

<Transformation of MPI_Reduce Function>

Figure 7:
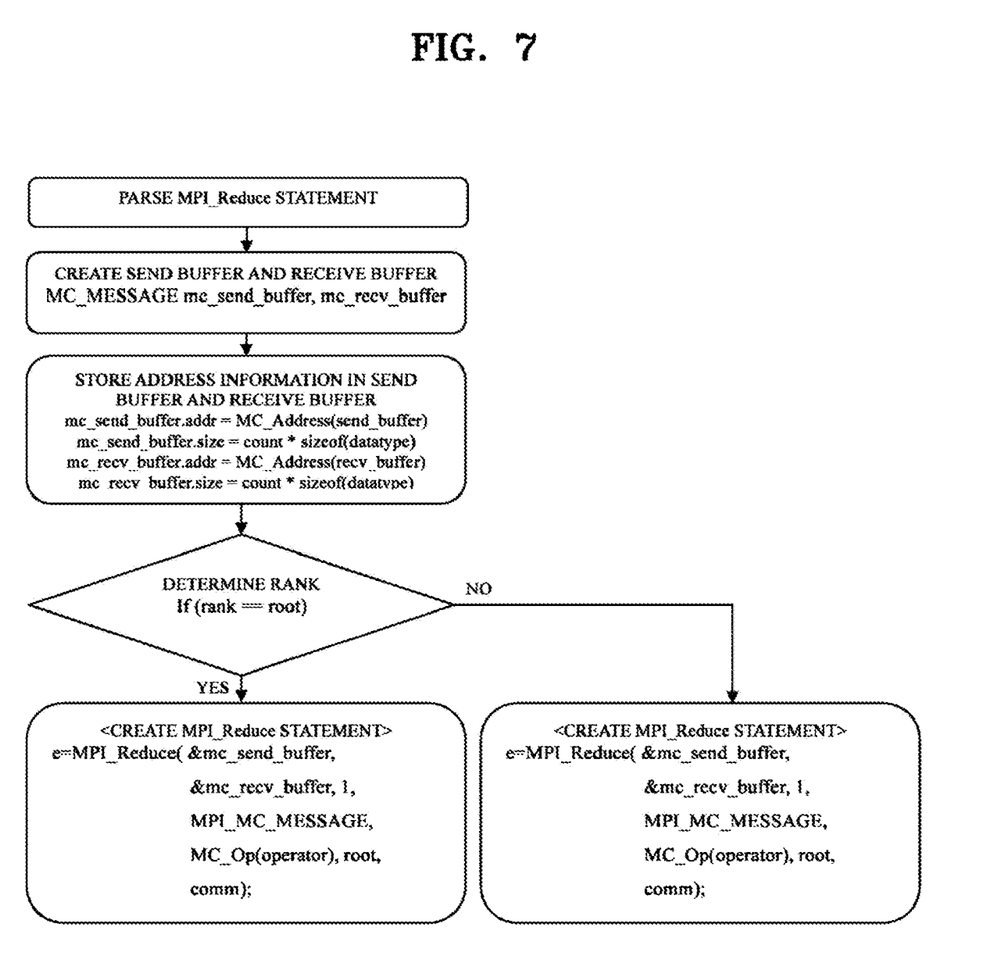
FIG. 7 illustrates a method of transforming MPI_Reduce which is an MPI function, according to one or more aspects of the disclosed embodiment.

FIG. 7 illustrates a method of transforming MPI_Reduce which is an MPI function, according to one or more aspects of the disclosed embodiment.

Input code

```
e = MPI_Reduce(send_buffer, recv_buffer, count, datatype, operator, root, comm);
```

Transformed code

```
{
MC_MESSAGE mc_send_buffer, mc_recv_buffer;
mc_send_buffer.addr = MC_Address(send_buffer);
mc_send_buffer.size = count * sizeof(datatype);
mc_recv_buffer.addr = MC_Address(recv_buffer);
mc_recv_buffer.size = count * sizeof(datatype);
if (rank == root) {// a single receiver
e = MPI_Reduce(&mc_send_buffer, &mc_recv_buffer, 1,
MPI_MC_MESSAGE,
MC_Op(operator), root, comm);
} else {   // a plurality of senders
e = MPI_Reduce(&mc_send_buffer, &mc_recv_buffer, 1,
MPI_MC_MESSAGE,
MC_Op(operator), root, comm);
}
}
```

<Transformation of MPI_Scatter Function>

Figure 8:
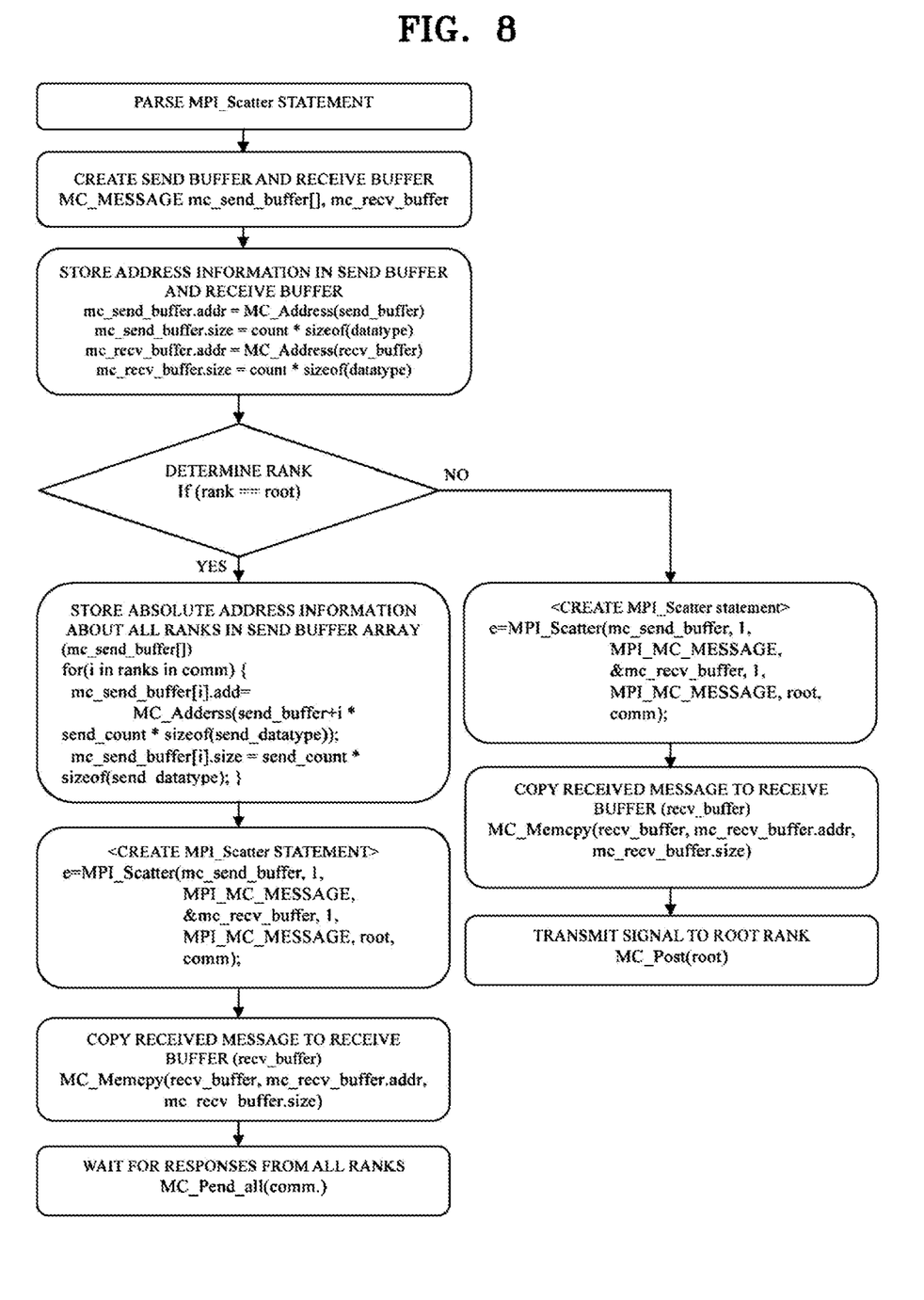
FIG. 8 illustrates a method of transforming MPI_Scatter which is an MPI function, according to one or more aspects of the disclosed embodiment.

FIG. 8 illustrates a method of transforming MPI_Scatter which is an MPI function, according to one or more aspects of the disclosed embodiment.

Input code

```
e = MPI_Scatter(send_buffer, send_count, send_datatype, recv_buffer, recv_count, recv_datatype, root, comm);
```

Transformed code

```
{
MC_MESSAGE mc_send_buffer[number of ranks in comm];
MC_MESSAGE mc_recv_buffer;
if (rank == root) {            // a single sender
for(i in ranks in comm)
{ mc_send_buffer[i].addr =
MC_Adderss(send_buffer+i * send_count * sizeof(send_datatype));
mc_send_buffer[i].size = send_count * sizeof(send_datatype);
}
e = MPI_Scatter(mc_send_buffer, 1, MPI_MC_MESSAGE,
&mc_recv_buffer,
1,MPI_MC_MESSAGE, root, comm);
MC_Memcpy(recv_buffer, mc_recv_buffer.addr,
mc_recv_buffer.size);
MC_Pend_all(comm);
} else {           // a plurality of receivers
e = MPI_Scatter(mc_send_buffer, 1, MPI_MC_MESSAGE,
&mc_recv_buffer, 1,
```

```
MPI_MC_MESSAGE, root, comm);
MC_Memcpy(recv_buffer, mc_recv_buffer.addr,
mc_recv_buffer,size);
MC_Post(root);
}
}
```

<Transformation of MPI_Gather Function>

Figure 9:
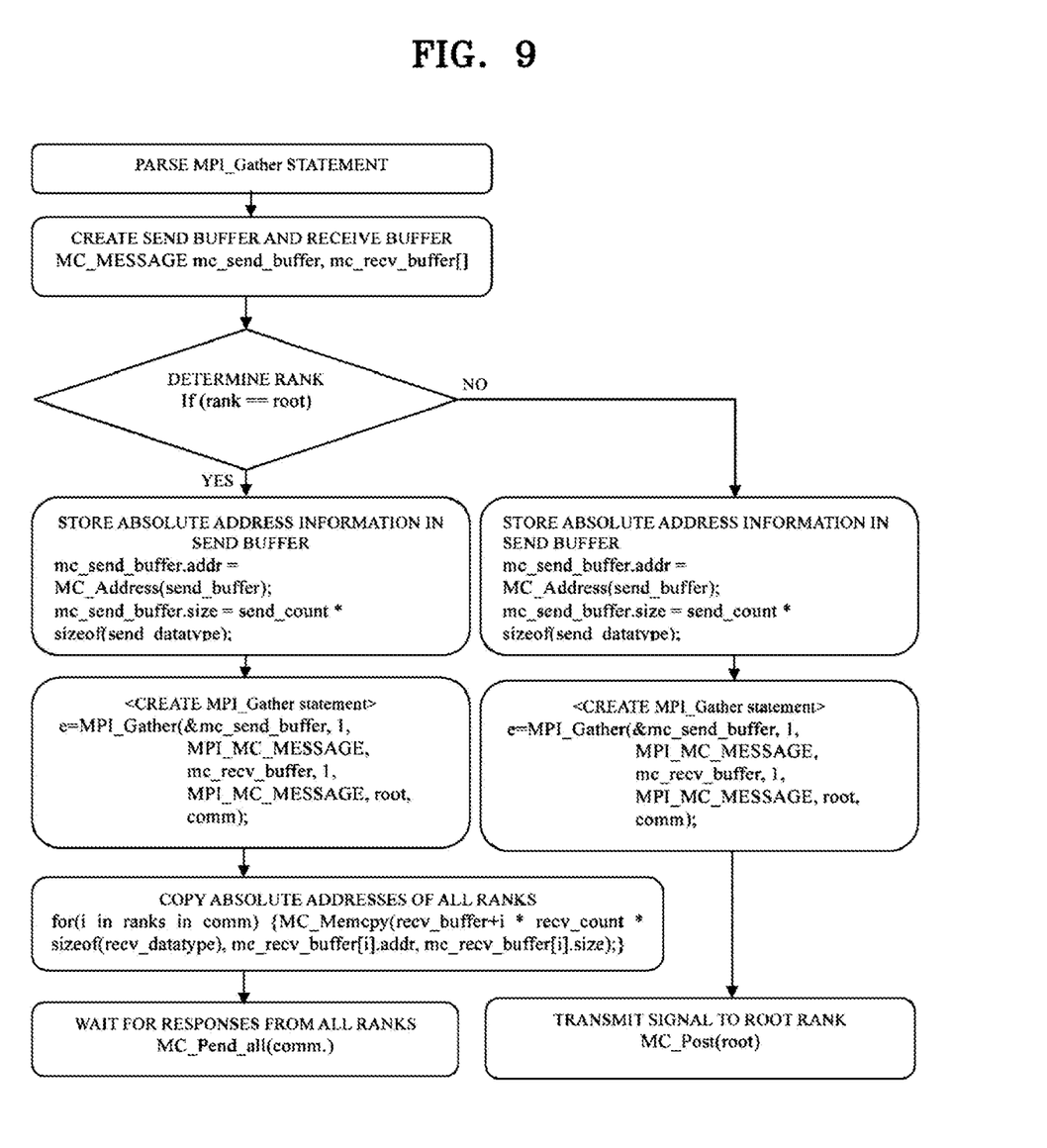
FIG. 9 illustrates a method of transforming MPI_Gather which is an MPI function, according to one or more aspects of the disclosed embodiment.

FIG. 9 illustrates a method of transforming MPI_Gather which is an MPI function, according to one or more aspects of the disclosed embodiment.

Input code

```
e = MPI_Gather(send_buffer, send_count, send_datatype,
recv_buffer, recv_count, recv_datatype, root, comm);
```

Transformed code

```
{
MC_MESSAGE mc_send_buffer;
MC_MESSAGE mc_recv_buffer[number of ranks in comm];
if (rank == root) {        // a single receiver
mc_send_buffer.addr = MC_Address(send_buffer);
mc_send_buffer.size = send_count * sizeof(send_datatype);
e=MPI_Gather(&mc_send_buffer, 1, MPI_MC_MESSAGE,
mc_recv_buffer, 1,
MPI_MC_MESSAGE, root, comm);
for(i in ranks in comm) {
MC_Memcpy(recv_buffer+i * recv_count * sizeof(recv_datatype),
mc_recv_buffer[i].addr, mc_recv_buffer[i].size);
}
MC_Pend_all(comm);
} else {// a plurality of senders
mc_send_buffer.addr = MC_Address(send_buffer);
mc_send_buffer.size = send_count * sizeof(send_datatype);
e = MPI_Gather(&mc_send_buffer, 1, MPI_MC_MESSAGE,
mc_recv_buffer, 1,
MPI_MC_MESSAGE, root, comm);
MC_Post(root);
} }
```

The above-described aspects of the disclosed embodiment provide the MPI program transformation method and apparatus such that MPI programs for high performance computers (HPCs) having an existing distributed memory architecture may be intactly applied to HPCs having a memory centric architecture. As a result, according to the present disclosure, many MPI programs developed for HPCs having a distributed memory architecture may be intactly applied to HPCs having a memory centric architecture without significant modifications, and many economical improvements may be obtained.

It should be understood that aspects of the disclosed embodiment described herein should be considered in a descriptive sense only and not for purposes of limitation. Descriptions of features or within each of the aspects of the disclosed embodiment should typically be considered as available for other similar features or aspects of the disclosed embodiment. While one or more aspects of the disclosed embodiment have been described with reference to the figures, it will be understood by those of ordinary skill in the art that various changes in form and details may be made therein without departing from the spirit and scope of the disclosure as defined by the following claims.

What is claimed is:

1. A method of transforming message passing interface (MPI) programs for memory centric computers, the method comprising:

loading a source code of an MPI parallel program for a high performance computer system into a storage medium of a program translation apparatus, in which a plurality of computers are connected in parallel to each other for distributed processing;

parsing the source code, by a processing device of the program translation apparatus, that extracts an MPI function statement;

creating, from an MPI function corresponding to the MPI function statement, a network function statement for communication with other computers through a network and a bus line function statement for directly accessing a memory shared by the plurality of computers through a bus line; and storing a transformed source code comprising the network function statement and the bus line function statement in the storage medium of the program translation apparatus;

wherein the MPI function comprises MPI_Send and a statement comprising the MPI_Send function comprises, as a parameter, an absolute address transporter storing absolute address information, and after the statement comprising the MPI_Send function is executed, a response from a target computer is waited for.

2. The method of claim 1, wherein the network function statement comprises an absolute address transporter storing absolute address information.

3. The method of claim 2, wherein the absolute address transporter is created by a structure (object) comprising absolute address information about the memory.

4. The method of claim 1, wherein the MPI function further comprises MPI_Recv, a statement comprising the MPI_Recv function comprises, as a parameter, an absolute address transporter storing absolute address information, and after the statement comprising the MPI_Recv function is executed, a response signal is sent to a source computer which has executed an MPI_Send function command.

5. The method of claim 1, wherein the MPI function further comprises MPI_Bcast, and when a corresponding process is a root process, a statement comprising the MPI_Bcast function executes the MPI_Bcast function to deliver absolute address information to all other processes and then waits for responses from all the other processes, and when the corresponding process is not the root process, the statement comprising the MPI_Bcast function executes the MPI_Bcast function and then transmits a response signal to the root process.

6. The method of claim 1, wherein the MPI function further comprises MPI_Reduce, and when a corresponding process is a root process, a statement comprising the MPI_Reduce function executes the MPI_Reduce function to receive absolute address information from all other processes and perform an operator calculation, and when the corresponding process is not the root process, the statement comprising the MPI_Reduce function executes the MPI_Reduce function to deliver absolute address information about the corresponding process to the root process.

7. The method of claim 1, wherein the MPI function further comprises MPI_Scatter, and when a corresponding process is a root process, a statement comprising the MPI_Scatter function executes the MPI_Scatter function to deliver an array of absolute address information about all other processes, and when the corresponding process is not the root process, the statement comprising the MPI_Scatter function executes the MPI_Scatter function to store a message transmitted from the root process in absolute address information about the corresponding process.

8. The method of claim 1, wherein the MPI function further comprises MPI_Gather, and when a corresponding process is a root process, a statement comprising the MPI_Gather function executes the MPI_Gather function to store absolute address information about another process at an absolute address of the corresponding process as an array and then store absolute address information about all other processes as an array, and when the corresponding process is not the root process, the statement comprising the MPI_Gather function executes the MPI_Gather function to deliver absolute address information about the corresponding process.

9. An apparatus for transforming MPI programs for memory centric computers, wherein the apparatus is configured to transform a source code of an MPI parallel program for a computer system in which a plurality of computers are connected in parallel to each other for distributed processing, and the apparatus comprises:
- a storage medium storing a source code and a transformed source code; and
- a processing device configured to parse the source code to extract an MPI function statement, creates, from an MPI function corresponding to the MPI function statement, a network function statement for communication with other computers through a network and a bus line function statement for directly accessing a memory shared by the plurality of computers through a bus line, store a transformed source code comprising the network function statement and the bus line function statement in the storage medium;
- wherein the MPI function comprises MPI_Send function, and a statement comprising the MPI_Send function comprises, as a parameter, an absolute address transporter storing absolute address information, and after the statement comprising the MPI_Send function is executed, a response from a target computer is waited for.

10. The apparatus of claim 9, wherein the network function statement comprises an absolute address transporter storing absolute address information.

11. The apparatus of claim 10, wherein the absolute address transporter is created by a structure (object) comprising absolute address information about the memory.

12. The apparatus of claim 9, wherein the MPI function further comprises MPI_Recv function, and a statement comprising the MPI_Recv function comprises, as a parameter, an absolute address transporter storing absolute address information, and after the statement comprising the MPI_Recv function is executed, a response signal is sent to a source computer which has executed an MPI_Send function command.

13. The apparatus of claim 9, wherein the MPI function further comprises MPI_Bcast function, and when a corresponding process is a root process, a statement comprising the MPI_Bcast function executes the MPI_Bcast function to deliver absolute address information to all other processes and then waits for responses from all the other processes, and
when the corresponding process is not the root process, the statement comprising the MPI_Bcast function executes the MPI_Bcast function and then transmits a response signal to the root process.

14. The apparatus of claim 10, wherein the MPI function further comprises MPI_Reduce function, and when a corresponding process is a root process, a statement comprising the MPI_Reduce function executes the MPI_Reduce function to receive absolute address information from all other processes and perform an operator calculation, and when the corresponding process is not the root process, the statement comprising the MPI_Reduce function executes the MPI_Reduce function to deliver absolute address information about the corresponding process to the root process.

15. The apparatus of claim 9, wherein the MPI function further comprises MPI_Scatter function, and when a corresponding process is a root process, a statement comprising the MPI_Scatter function executes the MPI_Scatter function to deliver an array of absolute address information about all other processes, and when the corresponding process is not the root process, the statement comprising the MPI_Scatter function executes the MPI_Scatter function to store a message transmitted from the root process in absolute address information about the corresponding process.

16. The apparatus of claim 9, wherein the MPI function further comprises MPI_Gather function, and when a corresponding process is a root process, a statement comprising the MPI_Gather function executes the MPI_Gather function to store absolute address information about another process at an absolute address of the corresponding process as an array and then store absolute address information about all other processes as an array, and when the corresponding process is not the root process, the statement comprising the MPI_Gather function executes the MPI_Gather function to deliver absolute address information about the corresponding process.

* * * * *

UNITED STATES PATENT AND TRADEMARK OFFICE
CERTIFICATE OF CORRECTION

| | | |
|---|---|---|
| PATENT NO. | : 10,963,323 B2 | Page 1 of 1 |
| APPLICATION NO. | : 16/659761 | |
| DATED | : March 30, 2021 | |
| INVENTOR(S) | : Shin et al. | |

It is certified that error appears in the above-identified patent and that said Letters Patent is hereby corrected as shown below:

On the Title Page

Assignee should read --SANGMYUNG UNIVERSITY INDUSTRY-ACADEMY COOPERATION FOUNDATION, Seoul (KR); ELECTRONICS AND TELECOMMUNICATIONS RESEARCH INSTITUTE, Daejeon (KR)--

Signed and Sealed this
Twenty-fifth Day of July, 2023

Katherine Kelly Vidal
*Director of the United States Patent and Trademark Office*